United States Patent
Zimmanck et al.

(10) Patent No.: US 11,966,242 B2
(45) Date of Patent: Apr. 23, 2024

(54) METHOD AND APPARATUS FOR LOAD CONTROL IN A POWER SYSTEM

(71) Applicant: Enphase Energy, Inc., Petaluma, CA (US)

(72) Inventors: Donald Richard Zimmanck, Sebastopol, CA (US); Adam Rosenstein, Rohnert Park, CA (US)

(73) Assignee: Enphase Energy, Inc., Petaluma, CA (US)

( * ) Notice: Subject to any disclaimer, the term of this patent is extended or adjusted under 35 U.S.C. 154(b) by 173 days.

(21) Appl. No.: 17/083,221

(22) Filed: Oct. 28, 2020

(65) Prior Publication Data

US 2021/0124385 A1 Apr. 29, 2021

Related U.S. Application Data (60) Provisional application No. 62/927,048, filed on Oct. 28, 2019.

(51) Int. Cl.
| | |
|---|---|
| G05B 13/02 | (2006.01) |
| G05F 1/66 | (2006.01) |
| H02J 3/14 | (2006.01) |
| H02J 3/32 | (2006.01) |
| H02J 3/38 | (2006.01) |

(52) U.S. Cl.
CPC ............. G05F 1/66 (2013.01); G05B 13/021 (2013.01); H02J 3/14 (2013.01); H02J 3/32 (2013.01); H02J 3/381 (2013.01)

(58) Field of Classification Search
USPC ........................................................ 700/298
See application file for complete search history.

(56) References Cited

U.S. PATENT DOCUMENTS

| | | | |
|---|---|---|---|
| 9,874,923 B1* | 1/2018 | Brown ................. | G06F 1/3234 |
| 2004/0024502 A1* | 2/2004 | Squires .................... | B60L 3/12 |
| | | | 701/2 |
| 2012/0013265 A1* | 1/2012 | Yang .................... | H05B 45/325 |
| | | | 315/246 |

(Continued)

FOREIGN PATENT DOCUMENTS

| | | | |
|---|---|---|---|
| JP | 2002152971 A | * | 5/2002 |
| JP | 5054110 B2 | | 10/2012 |

(Continued)

OTHER PUBLICATIONS

The International Search Report and the Written Opinion of the International Searching Authority, or the Declaration, PCT/US2020/057793 dated Jan. 29, 2021.

*Primary Examiner* — Emilio J Saavedra
(74) *Attorney, Agent, or Firm* — MOSER TABOA (57) ABSTRACT

Method and apparatus for load-based primary regulation in a power system. In one embodiment the method comprises receiving information pertaining to each load of a plurality of loads in a power distribution system; generating, using the information, a plurality of combinations of operating states for the plurality of loads that provides a pseudo-linear response for all the plurality of loads; generating a look up table (LUT) that comprises the plurality of combinations of operating states; and transmitting the LUT to each load of the plurality of loads for use by the plurality of loads in primary regulation.

20 Claims, 7 Drawing Sheets

(56) References Cited

U.S. PATENT DOCUMENTS

| | | | |
|---|---|---|---|
| 2012/0029720 A1* | 2/2012 | Cherian | H02J 13/00002 |
| | | | 700/297 |
| 2012/0185108 A1 | 7/2012 | Howe et al. | |
| 2018/0159327 A1* | 6/2018 | Fidigatti | H02J 3/144 |
| 2019/0190266 A1* | 6/2019 | Soulieres | H02J 3/24 |
| 2019/0393722 A1* | 12/2019 | Stöcker | H02J 4/00 |

FOREIGN PATENT DOCUMENTS

| | | | | |
|---|---|---|---|---|
| KR | 100953403 B1 | 4/2010 | | |
| WO | WO-2013102894 A1 * | 7/2013 | | H02J 13/00 |
| WO | WO-2015184188 A1 | 12/2015 | | |
| WO | WO 2019/028229 A1 | 7/2019 | | |

* cited by examiner

METHOD AND APPARATUS FOR LOAD CONTROL IN A POWER SYSTEM

CROSS-REFERENCE TO RELATED APPLICATIONS

This application claims benefit of U.S. provisional patent application Ser. No. 62/927,048, entitled "Methods and Apparatus for Load Control in a Power System" and filed Oct. 28, 2019, which is herein incorporated in its entirety by reference.

BACKGROUND

1. Field of the Disclosure

Embodiments of the present disclosure generally relate to power systems and, more particularly, to methods and apparatus for load control in a power system.

2. Description of the Related Art

Most AC power grids or systems are, typically, controlled using hierarchical control, predominantly consisting of three tiers: primary, secondary, and tertiary. Primary control, for example, can be an autonomous response programmed into all participating resources in which resource power is modulated as a function of locally measured frequency and/or voltage. Primary control is responsible for maintaining instantaneous balance of generation and load, but voltage and frequency, and thus interties, can fluctuate from intended targets as a function of a load. Secondary control is a communication-based tier which re-establishes voltage and frequency, and thus allows intertie power to flow after a disturbance. Tertiary control optimizes the economics of the system by setting target intertie power-flows, and thus the distribution of power among resources, in order to minimize the cost of operating the system.

Integrating load control into three-tier framework is not trivial because most loads have discrete states (e.g., on/off) and thus have discontinuities in their responses. If responses of loads are not coordinated, instabilities can arise, especially in small systems where individual loads can make up a significant portion of the overall capacity of a power system.

Therefore, there is a need in the art for methods and apparatus for improved load control in a power system.

SUMMARY

Embodiments of the present disclosure generally relate to methods and apparatus for load-based primary regulation in a power system as shown in and/or described in connection with at least one of the figures.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only a typical embodiment of this disclosure and are therefore not to be considered limiting of its scope, for the disclosure may admit to other equally effective embodiments.

DETAILED DESCRIPTION

Methods and apparatus described herein provide a control system for load control that receives and stores detailed data of all loads of a power system and is configured to control each of the various loads to optimize load control decisions. More particularly, the control system synthesizes a more continuous response of a power system by programming each load to have a look-up-table (LUT) in which a state of the load varies as a function of frequency and/or voltage. The LUTs of each load can be pre-arranged by a central coordinating device (e.g., a processor or controller) of the control system such that an overall load (e.g., all of the loads) of the power system has a more linear response with respect to frequency/voltage, thus allowing the load to be integrated into an existing hierarchical control framework e.g., into primary, secondary, and/or tertiary controls of the power system, similar to other devices in the power system, such as, generators, inverters, and the like. In one or more embodiments, techniques such as load control hysteresis are utilized; examples of such load control hysteresis may be found in commonly assigned U.S. patent publication no. 2016/0363949, entitled "Method and Apparatus for Control of Intelligent Loads in Microgrids" and filed Jun. 12, 2016, which is herein incorporated by reference in its entirety. Moreover, tertiary control of the control system is configured to optimize the dispatch of controllable loads to achieve optimal area economy for a user. For example, when the power system is running off grid, and thus not able to provide power to all the loads in the power system at once, the control system is configured to ensure that the most valuable combination of the loads is provided power. Such optimization, however, requires knowledge of a relative value of each load, which is dynamic and, therefore, often difficult to infer. Accordingly, the control system further provides an intuitive user interface that allows a user to interact with the control system, thereby allowing the control system to learn load values over time.

Furthermore, primary control of the control system is configured to provide an autonomous characteristic for a load so that the load can quickly respond to fluctuations of other loads within the power system, e.g., without relying on communication from a central gateway.

The control systems described herein comprise data on all load groups in a house or other structure that uses a power system, e.g., AC grid. The control systems can be configured for use with agent-based-modeling and, can also be configured to generate dynamic value scores for various types of loads within a power system, as will be described in greater detail below.

The control system is also configured to provide one or more user interfaces (e.g., graphical user interfaces) for configuring the control system with load model and configuration data. Additionally, the control system can be configured as a forecasting system configured to learn detailed information (e.g. machine learning) about the loads over-time and update the load model accordingly, as also described in greater detail below.

The control system is configured to control branch level load control as part of an interconnection of a power system. Additionally, in at least some embodiments, the control system is also configured to communicate or use third party load controllers, e.g., to implement a more fine-grained control of the loads on a power system. In such instances, some loads may be curtailable at both the branch level and individual levels, thus having two switching devices associated with the loads of the power system. In accordance with the present disclosure, as each load includes a corresponding load controller, in order for the control system to correctly associate load control action with correct device commands, the control system is configured to determine which load controller controls which loads. Accordingly, the control system uses one or more suitable interfaces for associating a load controller with a corresponding load. For example, in at least some embodiments, the control system is configured to associate a load with a corresponding load controller using a pull style interface, e.g., each load controller points to the load(s) that the load controller controls rather than the loads pointing to a load controller. Using the pull style interface facilitates configuring the two switching devices for controlling both the branch level load control and individual level load control. Alternatively or additionally, in at least some embodiments, e.g., when there is only branch level load control, a push style interface can be used.

Figure 1:
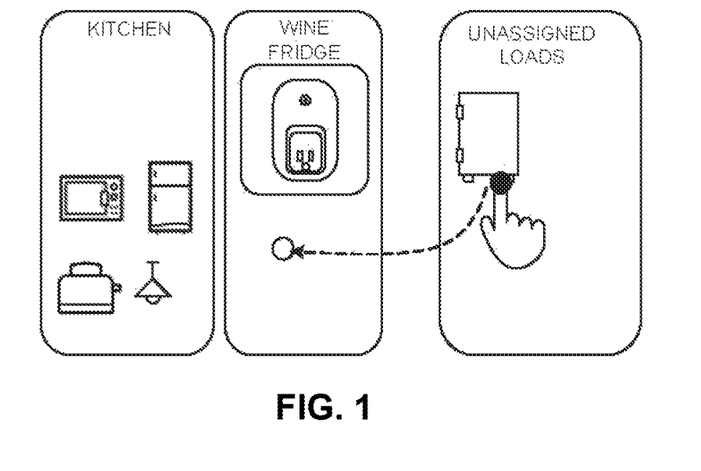
FIG. 1 is a diagram of a load controller interface configured for a discovery process, in accordance with one or more embodiments of the present disclosure.

FIG. 1 is a diagram of a load controller interface configured for a discovery process, in accordance with one or more embodiments of the present disclosure. More particularly, in at least some embodiments, the control system is configured to support a discovery process 100, e.g., where supported third party devices can be discovered by initiating a discovery routine on one or more suitable automation networks that can be used during the discover process (e.g., WiFi, Zigbee, and the like). The control system is configured to store discovered loads (e.g., loads) into memory that is accessible by the control system (e.g., a remote memory device or memory of a controller of the control system). The discovered devices, for example, can be complied into a load inventory list that is stored in the memory and accessible by a user, thus allowing the user to easily associate a load with a corresponding switching device and/or to create a new load that can be added to the control system for control thereof.

Figure 2:
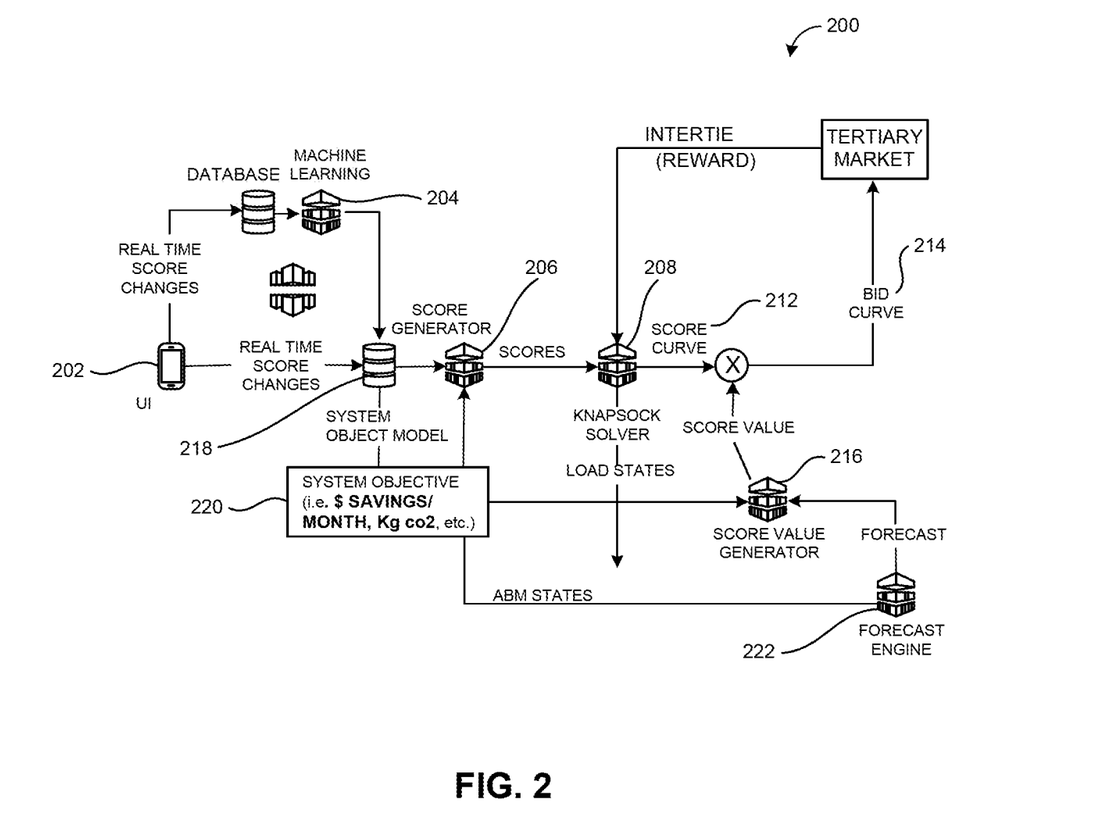
FIG. 2 is a block diagram of a system including a tertiary load controller, in accordance with one or more embodiments of the present disclosure.

FIG. 2 is a block diagram of a control system 200 including a tertiary load controller, in accordance with one or more embodiments of the present disclosure. The inventors have found that in theory, tertiary control of loads in a power system is quite simple. More particularly, a load is either turned off when the load's marginal value is less than a change in cost that the load causes, and a load is turned back on when the load's marginal value is greater than a change in cost that the load causes. There are several factors, however, which the inventors have found make tertiary control of loads in a power system far more complex. For example, users, typically, cannot accurately quantify a marginal value of loads in real time. Additionally, since a size of a load that is off may not be known at the time the load is off, calculating a change in cost that turning a load on will incur can be difficult. Moreover, more than one load may be turned off at the same time, thereby making a change in value that occurs indeterministic at load level. Furthermore, marginal values of loads can be highly dynamic (e.g., how long has a refrigerator been off, what is the temperature of hot water, what time of day it is, and the like).

Accordingly, in accordance with at least some embodiments, the control system 200 uses a unique load control user interface (UI) 202, which can be provided by one or more computing devices, e.g., smart phone, lap top, PC, etc., for receiving and interpreting user feedback to optimize load control. The UI 202 provided by the control system 200 is configured to allow a user to view a current state of the loads of the power system and modify the operation of the power system. For example, the UI 202 uses one or more intuitive interfaces (e.g., drag-and-drop interface) that are configured to provide, for example, a visual representation of the trade-offs of changing a state of one load to another load on the dragging and dropping action. Additionally, the control system 200 is configured to use the user feedback to learn (e.g., machine learning 204) a relative value of the loads and how the loads change over time (value schedules), thus providing energy objectives for a user with the least impact (highest retained value).

The control system 200 comprises a controller (or processor) that is programmed to include or use a control algorithm configured to determine whether a load should be turned on or off. More particularly, in at least some embodiments, the controller, using the control algorithm, calculates a score for each load of the power system, e.g., using a score generator 206. The score, which can be unitless, represents a relative value for a load. For example, in at least some embodiments, a load or loads (or combination of loads) with a relatively high score (or net score) is/are more preferable than a load or loads (or combination of loads) with a relatively low score, as will be described in greater detail below.

The controller uses the load scores and estimated wattages and generates a score curve using, for example, a knapsack solver 208. Knapsack solvers are categories of problems in which there are a series of items (e.g., loads), where each has a value (e.g., score) and weight (e.g., power), that need to be packed into a knapsack with finite capacity (e.g., total allowed load). The optimal solution maximizes the net value (e.g., total score) that can be packed into the knapsack.

Figure 3:
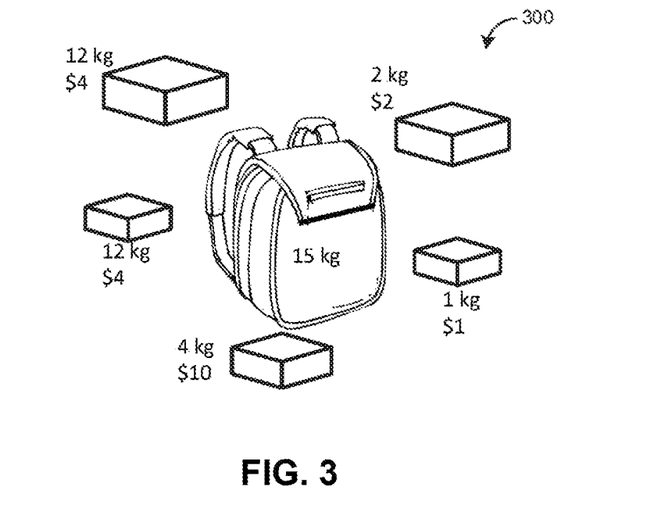
FIG. 3 is a diagram of a knapsack solver, in accordance with one or more embodiments of the present disclosure.

FIG. 3 is a diagram of a knapsack solver 300, in accordance with one or more embodiments of the present disclosure. The items (e.g., loads) left out of the knapsack represent the loads that would be shut down (e.g., off state) for a given capacity, as will be described in greater detail below.

In accordance with the present disclosure, for the given capacity, using the knapsack solver 300, the control algorithm solves for an array of power levels from 0 to full power to generate an optimal score curve, e.g., an x-axis can represent a total power (watts) and a y-axis can represent a total points (see Table 1 and Table 2, for example). The information included in Table 1 and Table 2 can be compiled in one or more LUTs that can be stored in memory of the controller or other part of the control system and/or power system.

TABLE 1

| Load | W | Score |
|---|---|---|
| Fridge | 300 | 95 |
| Well Pump | 1000 | 90 |
| Master Bedroom | 4 | 15 |

TABLE 2

| W | Net Score | Fridge | Well Pump | Master Bedroom |
|---|---|---|---|---|
| 1304 | 200 | ON | ON | ON |
| 1300 | 185 | ON | ON | OFF |
| 304 | 110 | ON | OFF | ON |
| 300 | 95 | ON | OFF | OFF |
| 4 | 15 | OFF | OFF | ON |

With reference again to FIG. 2, the inventors have found that for a load (or loads) to participate in a tertiary market 210, a score curve 212 generated by the control algorithm using the knapsack solver 208, needs to be converted into a bid curve 214 that is compatible with the tertiary control market 210. That is, because scores are unitless and only convey relative value, the controller uses the control algorithm to determine a currency-based value per unit score. More particularly, the control algorithm, using a score value generator 216, e.g., an iterative solver which takes a price forecast for the power system power along with a system-wide economic objective model 218, finds a relative value that achieves one or more economic objectives.

For example, if an economic objective 220 of a user of the power system or control system 200 is to save, for example, $10 over a one-month period, then the control algorithm can be configured to lower a value of points until, over the course of one month the control algorithm projects $10 worth of savings through load reduction or curtailment. If on the other hand, an objective is to save one pound of $CO_2$ emissions over one-month, the control algorithm can be configured to lower a value of a unit of score until kWh of a load is curtailed such that one point of $CO_2$ emissions would be offset. Moreover, if an objective is that a state-of-charge of the battery never drops below a threshold, e.g., 1%, 5%, 10%, etc., while off-grid, then the control algorithm is configured to lower a value to ensure that the battery never drops below the threshold, e.g., 10%. The inventors have found that such an iterative approach can be applied to any system level function that has a direct relationship with load used.

As noted above, the control system 200 includes one or more intuitive user interfaces. In addition to being configured to provide a visual representation of the trade-offs of changing a state of one load to another load, the user interface can be configured for changing a relative score of loads using, for example, one or more devices, such as a smart phone, laptop, PC, tablet, or other suitable device capable of performing a user action (e.g., drag-and-drop action or the like). For example, in at least some embodiments, the user interface can include two or more lists, a first list for loads that are off, and a second list for loads that are on. Each item in the first and second list can have one or more icons and/or other data showing a load's estimated power consumption and current score value. Accordingly, a user can perform, for example, a drag operation for dragging a load from an off state to an on state, e.g., a load can be set to a score value of a first load beneath the load that was dragged. The drag-and-drop interface automatically calculates the new states of the loads based on the new ranking and provides a visual representation of which loads will be turned off to satisfy the new ranking, e.g., with an animated movement on the drag operation.

Figure 4:
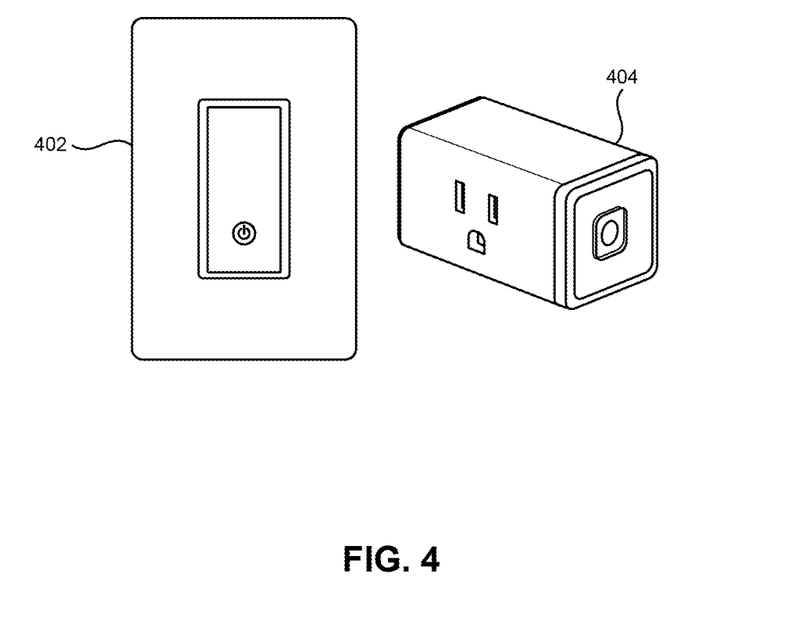
FIG. 4 are diagrams of various loads that can be controlled by the tertiary load controller, in accordance with one or more embodiments of the present disclosure.

FIG. 4 are diagrams of various loads that can be controlled by the tertiary load controller, in accordance with one or more embodiments of the present disclosure. More particularly, in at least some embodiments, the control system 200 can be configured for integration with other types of loads, e.g., remote-control interfaces. For example, controllable switches, such as Wi-Fi connected smart light switches 402 and smart outlets 404, which can also be controlled manually via a respective button press, can also be controlled by the control system 200 described herein. For example, in at least some embodiments, the control system 200 can be configured to automatically update the switches 402 and/or 404 outlets such that during a manual state change of the switches 402 and/or outlets 404, a state of the switches 402 and/or outlets 404 matches the new state of the switches 402 and/or outlets 404 stored by the control system 200; this provides another intuitive means for a user to over-ride load control decisions.

During installation of the control system 200, the control system 200 is configured to provide one or more default (e.g., predictable load preferences) user interfaces that can be based on typical user preferences and system configuration. For example, metadata, which can be collected from existing or known user systems, can be obtained and used to provide a suitable default user interface for a user.

With reference again to FIG. 2, the control system 200 can include a forecast interface 222 that allows a user to modulate or customize economic objective function(s) and realize (visualize) an effect of both a load control and the control system 200 forecast. Such information (feedback) can be provided in, for example, a slide-bar or other user interface.

Figure 5:
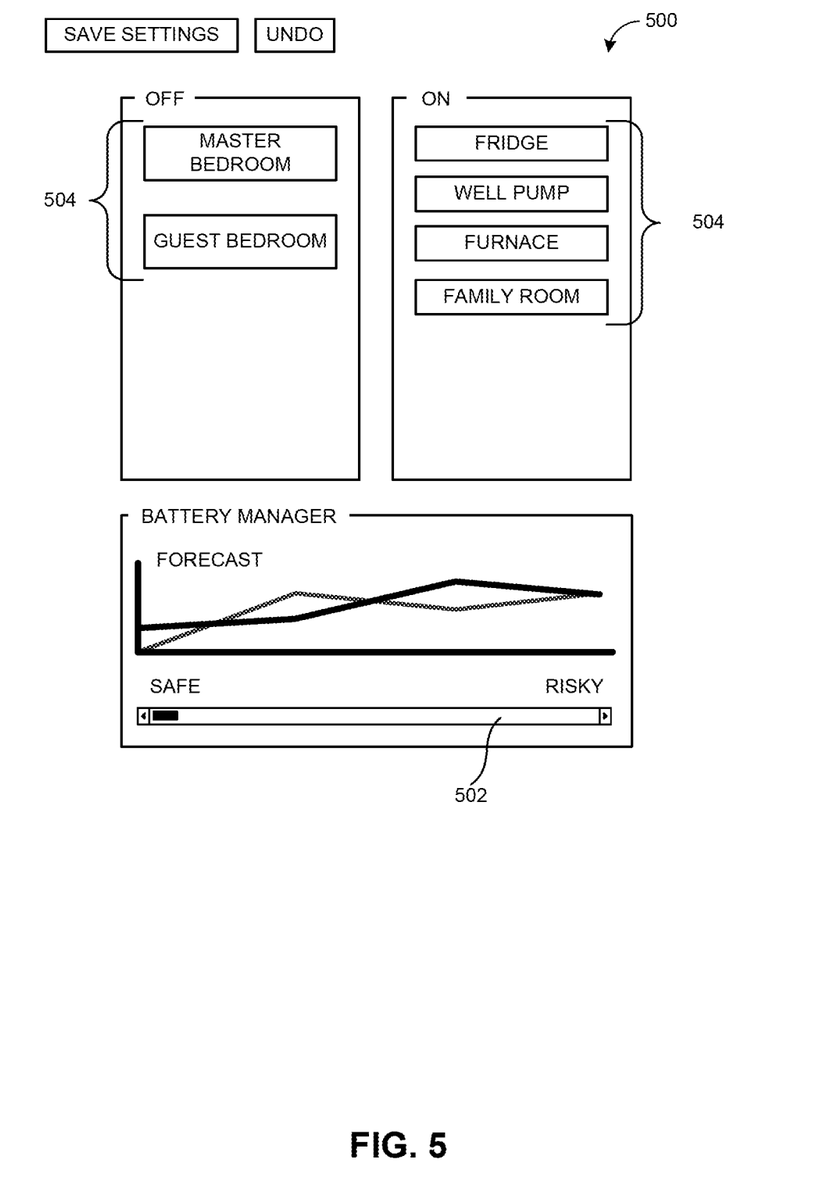
FIG. 5 is a diagram of a user interface, in accordance with one or more embodiments of the present disclosure.

In one particular embodiment, such as illustrated in FIG. 5, a UI 500 can be configured so that sliding a slide-bar (not shown), e.g., to the right, moves one or more loads 504 to a right and sliding the slide bar (e.g., to the left) moves one or more loads 504 to the left. In FIG. 5, for example, the UI renders an off-grid scenario to the left, e.g., Master Bedroom and Guest Bedroom are off-grid. Likewise, for a grid-tied scenario, e.g., for a battery manager, a bottom slide-bar 502 might say "Safe" and/or "Risky," "$ savings per month", and the like, when providing a forecast to a user.

As noted above, a power system can supply power to several types of loads coupled thereto, and each of the loads can have load score values that change dynamically based on one or more factors, e.g., historic state of the loads, external conditions associated with the loads, etc. Table 3 includes a few of the various types of loads that can be configured for use with a control system described herein and their respective score value criteria.

TABLE 3

| Load | |
|---|---|
| Refrigerator | Score should be based on internal temperature. |
| Well Pump | Score should be based on water pressure. |
| Furnace | Score should be based on house temperature. |
| Air Conditioner | Score should be based on house temperature. |
| EV Charger | Score should be based on battery state-of-charge and estimated range required in next use. |
| Water Heater | Score should be based on water temperature. |
| Pool Heater | Score should be based on water temperature |

As can be appreciated, for most of the larger loads of a load group connected to a power system (e.g., a power system of a home), a control algorithm in accordance with the present disclosure is configured (or programmed) to use a dynamic score generation process. Accordingly, for illustrative purposes, the examples of load scores are described herein as being based on a dynamic value, which can be a function of a load dynamic variable (e.g., refrigerator temp, water pressure, and the like) and which, typically, may not be measured directly.

Additionally, in at least some embodiments, the control algorithm can be configured (or programmed) for machine learning, thus increasing the overall efficiency of a power system. More particularly, loads can be correlated between their load values as a function of human behavior (e.g., machine learning 204 as described above with respect to FIG. 2). For example, when a value of a load, for example, in a kitchen increases, such an increase can be attributed to a person being in the kitchen and using one or more other loads. Thus, there is a likelihood that a value of the other loads in the kitchen will also increase, e.g., as a result of an increased chance of the other loads needing to be used. Accordingly, the control algorithm can use such information as input for determining one or more of the system-wide economic objective model 218.

The control system 200 is also configured to support one or more load constraints on a load, depending on the type of load. For example, if a load is a refrigerator, the constraint can be, for example, a min/max temperature of the refrigerator. If the load is a well pump, the constraint can be, for example, a min/max pressure of the well pump. If the load is an air conditioner (AC), the constraint can be, for example, a min/max on times of the AC. The constraints can be programmed into the score generator 206 and used by the control algorithm to automatically map a value of the load to a level that enforces the constraint.

Figure 6:
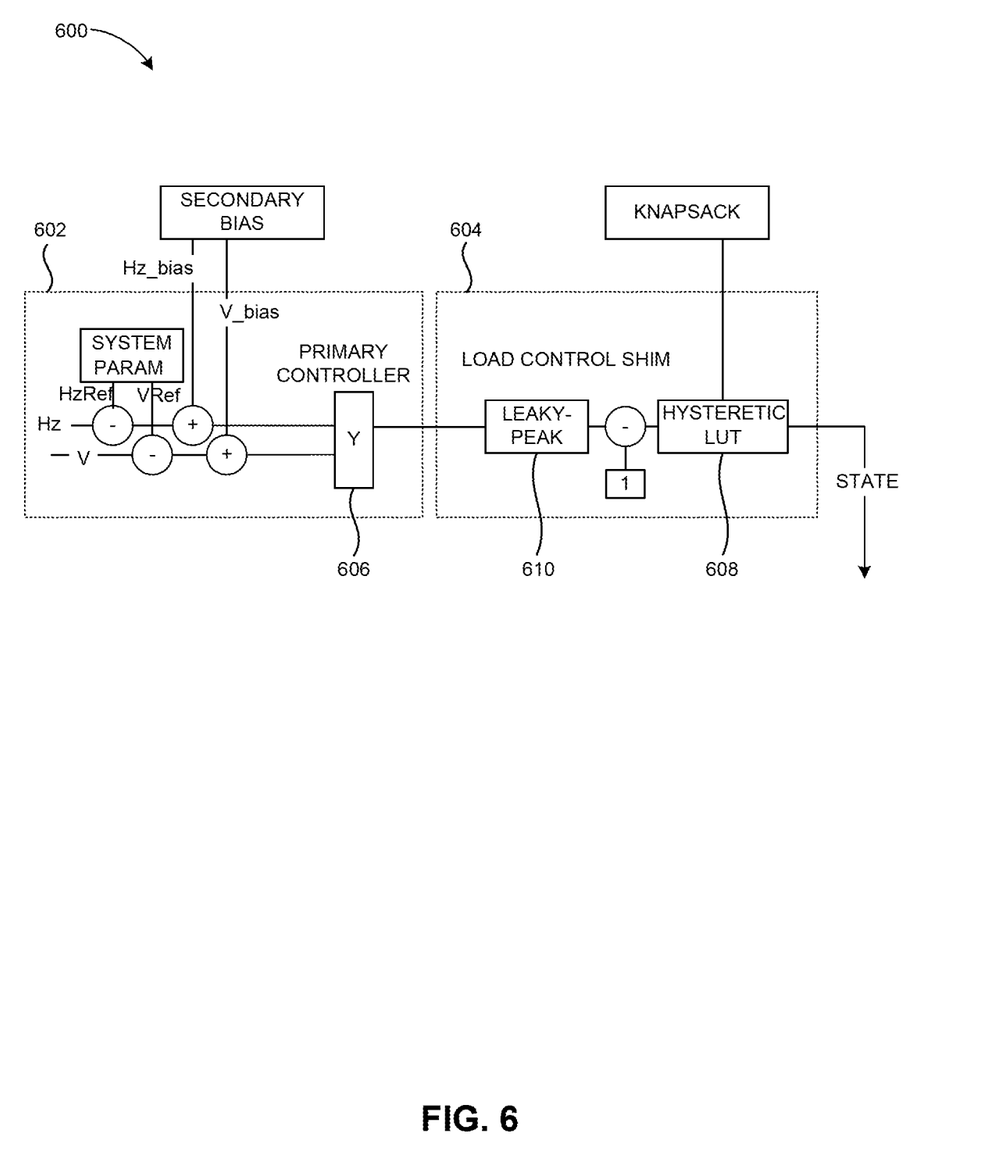
FIG. 6 is a schematic diagram of control system including primary control, secondary control, and tertiary control, in accordance with one or more embodiments of the present disclosure.

FIG. 6 is a schematic diagram of control system 600 including primary control, secondary control, and tertiary control, in accordance with one or more embodiments of the present disclosure. The control system 600 can function as the control system 200. The primary control and secondary control 602 are configured to output active and reactive current commands for a load (e.g., resource). For example, with respect to throttleable loads of a power system, such as inverter coupled batteries and photovoltaic (PV) modules, the output can be fed directly into a load controller of the load. In instances, however, where the loads are not throttleable and are constrained to a finite number of pre-determined states (e.g., on or off), the tertiary control 604 of the control system 600 is configured to generate a load state (e.g., on or off) as an output rather than active and reactive currents, but still allow the loads to participate in primary regulation in a similar manner to other resources, in a manner as described above.

Because load control is, typically, the most expensive form of primary regulation, in at least some embodiments, the inventors have found that load curtailment should begin after all conventional primary control operation has been exhausted. Accordingly, to simplify this implementation, the primary and secondary control 602 can use a Y matrix determiner 606 configured to output a value of 1 when the power system is at full capacity.

As part of the secondary control operation of the control system 600, the primary and secondary control 602 is configured to calculate the power system wide governing response coefficients G_00, G_01, G_10, G_11. The primary and secondary control 602 is configured to invert and normalize this matrix to an estimated power system capacity to calculate the Y coefficients using Equations (1) and (2)

$$Y_{00} = \frac{G_{11}}{I_{GMAX}(G_{00}G_{11} - G_{01}G_{10})}, \quad (1)$$

$$Y_{01} = -\frac{G_{01}}{I_{GMAX}(G_{00}G_{11} - G_{01}G_{10})}, \quad (2)$$

where $I_{GMAX}$ represents a maximum active current that the power system is capable of providing. If, for example, one of the loads is a PV load configured for maximum power point tracker (MPPT) control, the control system 600 is configured to calculate the maximum active current from the capacities of all other active loads (e.g., battery, generator, fuel cell, etc.). If a PV load is configured for and operating using curtailing, the control system 600 is also configured to estimate the PV potential, which in at least some embodiments, can be determined by a PV area controller (not shown) of the PV load.

In at least some embodiments, it is assumed that a load will typically be used to participate in active current based regulation only, so in such embodiments, the Y_10 and Y_11 coefficients are not calculated.

As noted above, one or more load control LUTs are configured to provide a pseudo-linear response with coordinated loads turning on/off (e.g., in a binary fashion), although in some other embodiments one or more of the loads may be coordinated to operate in one of a variety of discrete states (e.g., low, medium, high). To minimize an amount of switching events and associated flicker that can sometimes occur during the switching events, the control system 600 is configured to generate switch combinations for a pseudo-linear response with a finite step or load size (e.g., 500 W). For example, in at least some embodiments, the control system 600 is configured to generate switch combinations with relatively small step sizes. The inventors have found that smaller step sizes, provide a more linear pseudo-response. Smaller step sizes, however, also provide more switching events, and because the loads may have different response times, smaller step sizes can sometimes emulate non-monotonic responses, which can cause system oscillations with a power system.

Accordingly, in at least some embodiments, a control algorithm used by a controller in the tertiary control 604 is configured (or programmed) to calculate switch combinations closest to target responses (e.g., using a knapsack solver described above). In such embodiments, each load is given a value equal to that load's weight with the knapsack solver. For example, Table 4 illustrates examples of four loads that can be configured for use in load-based primary regulation, e.g., primary control.

TABLE 4

| Load | W |
|---|---|
| Refrigerator | 300 |
| Well Pump | 1000 |
| Water Heater | 2e3 |
| Lights | 120 W |

Table 5 illustrates knapsack generated load combinations targeting, for example, a 500 W switch step.

TABLE 5

| W | Fridge | Well Pump | Water Heater | Lights |
|---|---|---|---|---|
| 3420 | ON | ON | ON | ON |
| 3000 | OFF | ON | ON | OFF |
| 2420 | ON | OFF | ON | ON |
| 2000 | OFF | OFF | ON | OFF |
| 1420 | ON | ON | OFF | ON |
| 1000 | OFF | ON | OFF | OFF |
| 420 | ON | OFF | OFF | ON |
| 0 | OFF | OFF | OFF | OFF |

The control algorithm uses the information in Tables 4 and 5 to generate a hysteretic LUT. Additionally, the control algorithm calculates increment and decrement information using, for example, Equations (3) and (4):

$$X_{INC}[x] = \frac{W_{loadMAX} - W[n]}{W_{systemMAX}}, \quad (3)$$

$$X_{dec}[n] = X_{inc}[n] - K_{hys}(X_{inc}[n] - X_{inc}[n-1]), \quad (4)$$

where $K_{\_hys}$ represents the hysteretic coefficient. A value of $K_{\_hys}=0$ generates a non-hysteretic curve, and a value of $K_{\_hys}=1$ generates a hysteretic curve with no safety margin, e.g., the power system converges to a point which limit-cycles between 2 thresholds. The inventors have found that a value between 2 and 3 is recommended to minimize chances of oscillations (e.g., limit-cycle oscillations) occurring within a power system. For example, Table 6 illustrates a hysteretic LUT (see LUT compiler 608 of FIG. 6) with thresholds for $K_{\_hys}=2$. Accordingly, for $K_{\_hys}=2$, and using the information from Tables 4-6, when a power system is providing no power to the loads, e.g., Refrigerator, Well Pump, Water Heater, Lights, the total power is zero, see Table 5 all off states, for example. Next, when with the Refrigerator and Lights are on, see Table 5 on state for Refrigerator and Lights, the power system provides 300 W and 120 W of power (see Table 4, for example), respectively, and the increment and decrement is 0.3 and 0.258, respectively.

TABLE 6

| INC | DEC | Fridge | Well Pump | Water Heater | Lights |
|---|---|---|---|---|---|
| 0 | NA | ON | ON | ON | ON |
| 0.042 | −0.042 | OFF | ON | ON | OFF |
| 0.1 | −0.016 | ON | OFF | ON | ON |
| 0.142 | 0.058 | OFF | OFF | ON | OFF |
| 0.2 | 0.084 | ON | ON | OFF | ON |
| 0.242 | 0.158 | OFF | ON | OFF | OFF |
| 0.3 | 0.184 | ON | OFF | OFF | ON |
| NA | 0.258 | OFF | OFF | OFF | OFF |

Continuing with reference to FIG. 6, the tertiary control 604 of the control system 600 also includes a leaky-peak detector 610 that is configured to coordinate the control action among the loads of the power system that may have varying response times. For example, if all loads are powered, then each load responds based on a peak loading of the power system, and each load gradually relaxes based on the power system convergence. Accordingly, the leaky-peak detector 610 of the control system 600 is configured to calculate a relaxation constant that provides enough time for a slowest load controller of a load in the power system to engage. Accordingly, when a load surge is transient in nature, a load controller can initially over-curtail and then gradually relax into steady-state operation.

Figure 7:
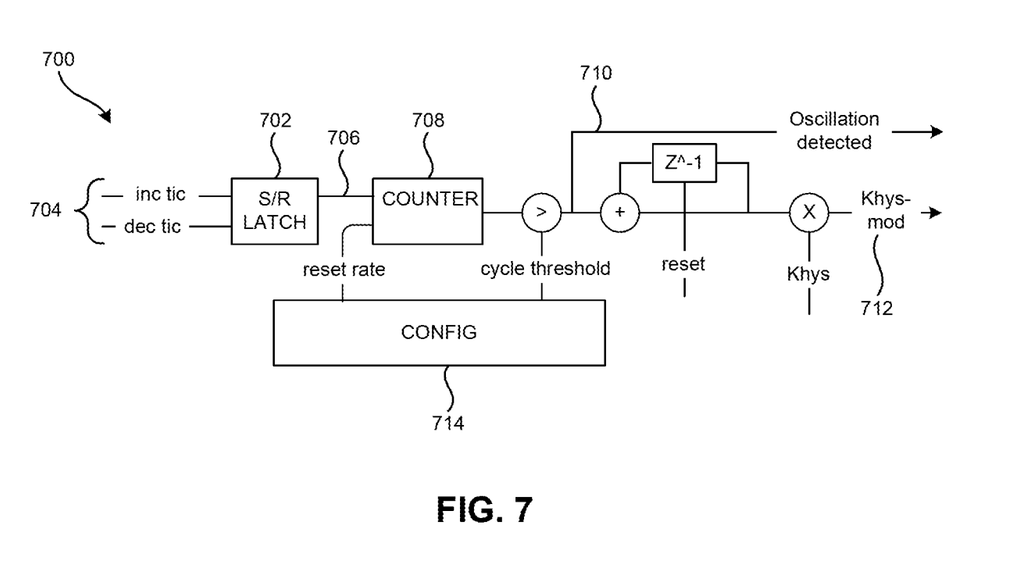
FIG. 7 is a schematic diagram of a limit-cycle detection prevention circuit, in accordance with one or more embodiments of the present disclosure.

In accordance with the present disclosure, while the hysteresis calculations for the hysteretic LUT compiled by the LUT compiler 608 are configured to reduce the chance of limit-cycle oscillations, there exists a possibility of limit-cycle oscillations still occurring. For example, if a load's actual power is considerably higher than a value used to generate the hysteretic LUT and/or associated hysteresis calculations, then limit-cycle oscillations can still occur. Additionally, even though the leaky-peak detector 610 is configured to considerably reduce limit-cycle oscillations, such limit-cycle oscillations cannot be completely eliminated using only the leaky-peak detector 610. Accordingly, the control system 600 is further configured to autonomously detect limit-cycle oscillations and automatically increase $K_{\_hys}$ until the limit-cycle oscillations are eliminated. For example, FIG. 7 is a schematic diagram of a limit-cycle detection prevention circuit, in accordance with one or more embodiments of the present disclosure. More particularly, the control system 600 includes a limit-cycle detection and prevention (LDP) circuit 700. The LDP circuit 700 includes, for example, an S/R latch 702 that receives one or more inputs. For example, inc tic and dec tic inputs 704 can be received at the S/R latch 702 to determine if a power system is increasing power or decreasing power, e.g., based on incrementing or decrementing information included in the hysteretic LUT. The S/R latch 702 outputs a signal 706 to a counter 708 for incrementing the counter 708, which is programmed to decrement at a fixed rate. For example, in at least some embodiments, the fixed rate corresponds to a maximum allowable flicker rate of the loads (e.g., 0.1 Hz). Accordingly, if the LDP circuit 700 detects that limit-cycle oscillations are above the fixed rate, the LDP circuit 700 transmits a limit-cycle oscillation signal 710 and a $K_{\_hys}$ mod signal 712 to the control system 600, which, in turn, increases the $K_{\_hys}$ threshold until the limit-cycle oscillations are eliminated (e.g., stop). The new $K_{\_hys}$ threshold is latched to this level until it receives a reset command from a gateway 714 of the power system (e.g., configuration circuitry, at which point it defaults back to the original $K_{\_hys}$ threshold. The gateway 714 may also be configured to increase the default $K_{\_hys}$ threshold constant at this time. One or more adders, multipliers, and the like, may also be provided in the LDP circuit 700.

As noted above, the control systems described herein are configured to provide load control techniques for efficiently managing overloads in an optimized manner, providing the capability to have a pseudo-linear response, thus maximizing an amount of energy that remains available during overloads. Additionally, in at least some embodiments, the control systems can be configured to simply shut off all eligible loads as soon as the power system is overloaded and turn the loads back on when there is enough capacity on the power system to handle the loads. More particularly, the control algorithms described herein can be configured (or programmed) to generate a LUT to generate just two combinations (all on and all off). In such embodiments, the inventors have found that using a lower hysteresis threshold (e.g., 1.2) can be advantageous. For example, in such an embodiments, if a high a hysteresis threshold is used and the loads make up a significant percentage of the power system capacity, there is a chance that the loads will never turn back on from an off state. For example, and with respect to Table 7 below, if there is 3.42 kW of primary response load on a 10 kW system, and if a $K_{\_hys}=2$ is used, then the loads will not turn back on until the power system is only loaded to, for example, 10 kW−2*3.42 kW=3.16 kW.

TABLE 7

| INC | DEC | Fridge | Well Pump | Water Heater | Lights |
|---|---|---|---|---|---|
| 0 | NA | ON | ON | ON | ON |
| NA | −0.342 | OFF | OFF | OFF | OFF |

The control system's tertiary control of loads operates deterministically based on data which, as noted above, is stored in memory (e.g., a database, LUT, etc.), so all load control actions can be reverse engineered from the stored data. Moreover, the control system's primary and secondary control of loads is autonomous, so troubleshooting all autonomous control actions is logged within the load and can be stored in, for example, one or more suitable non-volatile memory devices capable of being electronically reprogrammed and erased, e.g., flash memory. Each log entry can include, but is not limited to, a timestamp, state change, stress level, voltage, frequency, etc.

Figure 8:
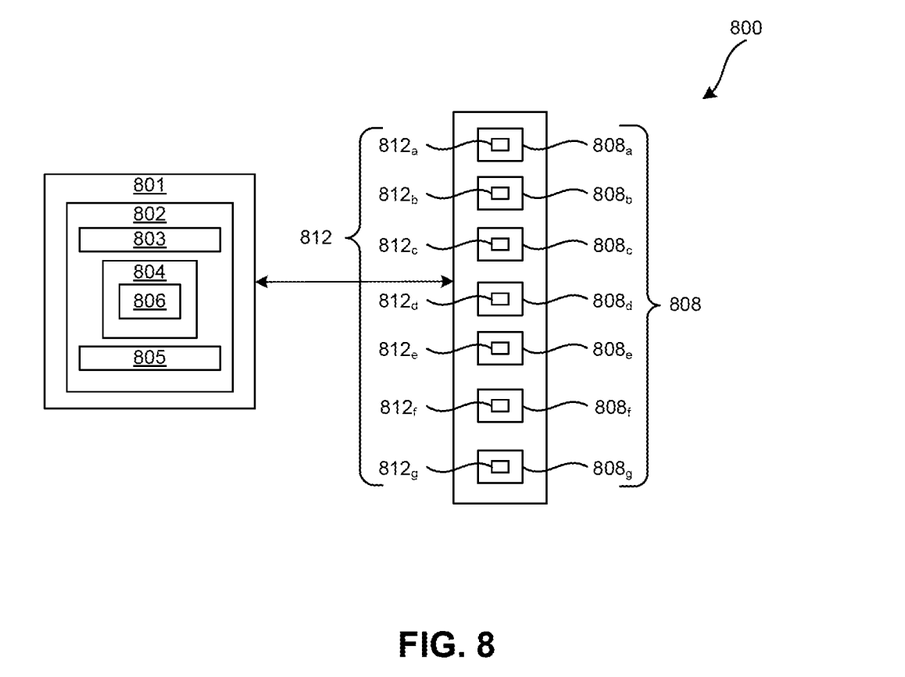
FIG. 8 is a block diagram of a power system including a control system configured for control of a power system, in accordance with one or more embodiments of the present disclosure.

FIG. 8 is a block diagram of a power system 800 including a control system 801 configured for control of the power system 800, in accordance with one or more embodiments of the present disclosure.

The control system 801 includes a controller 802 that is coupled to various components of the power system 800 to control the operation thereof. The controller 802, for example, may be any form of general-purpose computer processor that can be used in any setting for controlling one or more power systems. The controller 802 includes a central processing unit (CPU) 803, support circuits 805, and a memory (or non-transitory computer readable storage medium) 804.

The controller 802 is in operable communication with one or more load controllers 812a-812g (hereinafter collectively referred to as load controllers 812) of corresponding loads 808a-808g (hereinafter collectively referred to as loads 808) via a wired (e.g., power line communication) and/or wireless interface (e.g., WiFi, Zigbee, and the like) capable of providing communication between the controller 802 and/or the load controllers 812. In at least some embodiments, the loads 808 can be for example, a refrigerator (or other kitchen appliance), a well pump, a furnace, an air conditioner, an electric vehicle (EV) charger, a water heater, one or more smart control devices (e.g., Wi-Fi connected light switches and/or smart outlet, or the like), a pool heater, and the like. Additionally, the load controllers 812 can be in operable communication with each other, e.g., via a wired and/or wireless interface.

In certain embodiments the controller 802 is configured to receive one or more inputs from a user. For example, in at least some embodiments, the controller 802 is configured to receive information, via one or more of the previously described user interfaces, relating to one or more of the economic objectives, forecast information, etc. Additionally, during a discovery process, e.g., using a pull interface, the controller 802 is configured to receive an input from, for example, the load controllers 812 for receiving information relating to a corresponding one of the load 808. The information can include, for example, load information such as power requirements of load, state information of a load (e.g., on, off, medium, high, intermittent, and the like), type of load, or other information suitable for allowing the controller 802 to function in a manner as described herein. The controller 802 may use one or more control algorithms (e.g., stored in the memory 804) to determine a score (e.g., using a knapsack solver) for each of the loads 808, as described above with respect to Tables 1-3.

The controller 802 may also comprise a load-based primary regulation control algorithm (e.g., stored in the memory 804) for using information related to each of the loads 808, such as the information included in Table 4, to compute load combinations targeting a finite load step (e.g., such as in Table 5) and also generate one or more load-based primary regulation LUTs, e.g., a hysteretic LUT as shown in Table 6, where a load's state varies as a function of local frequency and/or local voltage. The LUT can include discrete states (e.g., on/off states) for each of the loads based on one or more determined switch combinations (e.g., a minimum amount of switching events) having a finite step size, e.g., 500 W. In at least some embodiments, the control algorithm generates increment and decrement thresholds using Equations (1) and (2), e.g., when the LUT is a hysteretic LUT. In determining the increment and decrement thresholds, the control algorithm determines a hysteretic coefficient $K_{\_hys}$ that reduces limit-cycle oscillations in the power system 800. After the hysteretic LUT is compiled the controller 802 may store the LUT in the memory 804 so that the LUT can be updated as needed (e.g., loads are added/removed, changing of operating characteristics of a load, economic objectives change, forecast information changes, and the like) and transmits the LUT to each of the load controllers 812. The load controllers 812 store the LUTs in memory local to a corresponding one of the loads 808, for use during primary regulation. As such, the states of the loads 808 are coordinated when participating in primary regulation such that the overall load (i.e., the summation of all of the loads 808) has a pseudo-linear response with respect to system frequency and/or voltage.

The support circuits 805 are coupled to the CPU 803 for supporting the CPU 803 in a conventional manner. The support circuits 805 include cache, power supplies, clock circuits, input/output circuitry and subsystems, transceivers, and the like.

The memory 804 of the controller 802 may be one or more of readily available memory such as random access memory (RAM), read only memory (ROM), floppy disk, hard disk, optical storage media (e.g., compact disc or digital video disc), non-volatile memory devices capable of being electronically reprogrammed and erased, e.g., flash drive, or any other form of digital storage, local or remote.

Figure 9:
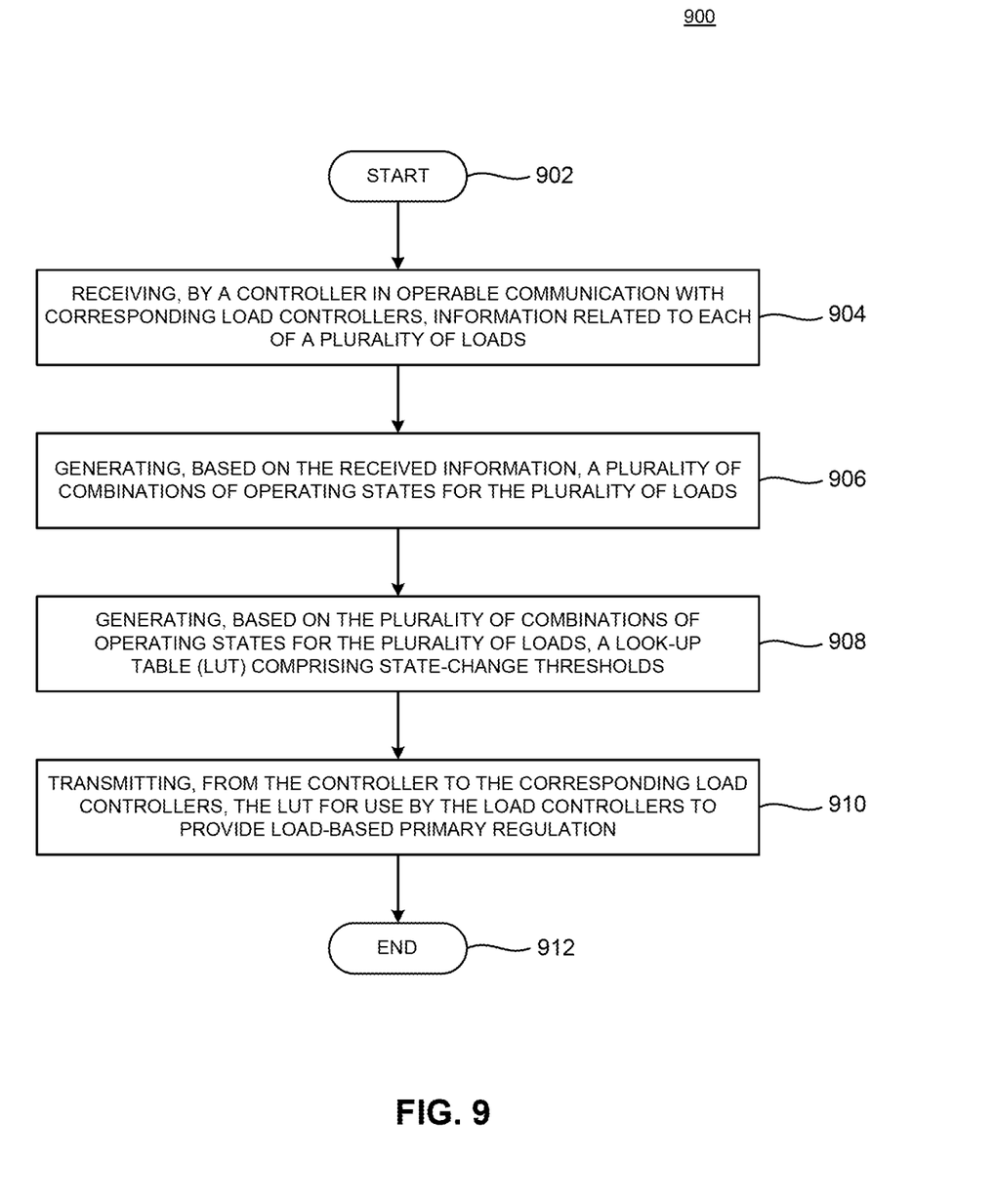
FIG. 9 is a flowchart of a method using a pseudo-linear response for controlling a power system, in accordance with one or more embodiments of the present disclosure.

Inventive methods as described herein, may be stored in the memory 804 as one or more software routines 806 (e.g., a load-based primary regulation control module 806) that may be executed or invoked to control the operation of the power system 800 (e.g., primary, secondary, and/or tertiary control of the power system 800) in a manner described herein. In certain embodiments the software routine 806 may also be stored and/or executed by a second CPU (not shown) that is remotely located from the hardware being controlled by the CPU 803. In one or more embodiments, instructions of the software routine 806, when executed by the CPU 803, configure the controller 802 to perform a method 900 for load-based primary regulation control for use in the power system 800.

The method 900 begins at step 902 and proceeds to step 904. At step 904, a controller, e.g., the controller 802, in operable communication with corresponding load controllers. e.g., load controllers 812, receives information relating to each load of the plurality of loads. For example, as noted above, the information can include load information such as power requirements of load, state information of a load (e.g., on, off, medium, high, intermittent, and the like), type of load, power consumption by the load for various states of the load, and/or other information suitable for allowing the controller 802 to function in a manner as described herein. The controller may receive the information from the load controllers, from some other device within the system, or from some combination thereof. Additionally, in some embodiments, the controller is also configured to receive one or more inputs from a user. For example, in at least some embodiments, the controller is configured to receive information relating to one or more of the economic objectives, forecast information, and the like. The controller may store any or all of the information received, for example in one or more LUTs. One example of information that may be received is shown in Table 4.

Next, at step 906, the controller uses information received to generate combinations of operating states for the loads such that the overall load (i.e., the total of the loads) has a pseudo-linear response for primary regulation. The controller may store the generated combinations, for example in one or more state tables. One example of such a state table may be found in Table 5. The computer may additionally or alternatively store the generated combinations in a LUT.

At step 908, the controller determines, based on the combinations of operating states, one or more operating thresholds for each of the loads (which also may be referred to as state-change thresholds), such as the increment and decrement thresholds described in Equations (3) and (4). The controller stores the computed information in a LUT. For example, in at least some embodiments, the controller can use a control algorithm to compile the LUT in a manner as described above. For example, the LUT can be a hysteretic LUT (e.g., including the increment and decrement information listed in Table 6). Conversely, in at least some embodiments, the LUT can simply include the information listed in Table 5 (e.g., including on/off state information without the increment and decrement information). The controller can store the LUT in a memory, e.g., the memory 804, and at step 910, the controller can transmit the LUT including the stored information to the corresponding load controllers, and at step 912 the method 900 ends.

During operation of the power system, each of the loads, under control of the corresponding load controller and using the LUT transmitted from the controller, can be switched between discrete states (e.g., one of an on state or an off state) across at least one of a frequency range or a voltage range of the power system, based on a percentage of power used by each of the loads. For example, based on a 500 W switch step and a total power usage of 2420 W capable of being supplied by the power system, the load controller of a refrigerator can switch the refrigerator from an off state to an on state, the load controller of a well pump can maintain the well pump in an off state, the load controller of the water heater can maintain the water heater in an on state, and the load controller of the lights can switch the lights from an off state to an on state (e.g., see Table 5, for example).

While the methods and apparatus have been described herein using a control system that is configured to support on/off control of loads, the present disclosure is not so limited. For example, some loads are capable of multiple states, each with a distinct value/load change. For example, some loads, e.g., smart water heaters, fans, space heaters, etc., have off, low, med, and high settings. The inventors have found that the control algorithms can be configured to control such loads, but doing so may require the control algorithm to use, for example, a more complex knapsack solver for mixed 0/1 and multi-state loads.

Figure 10:
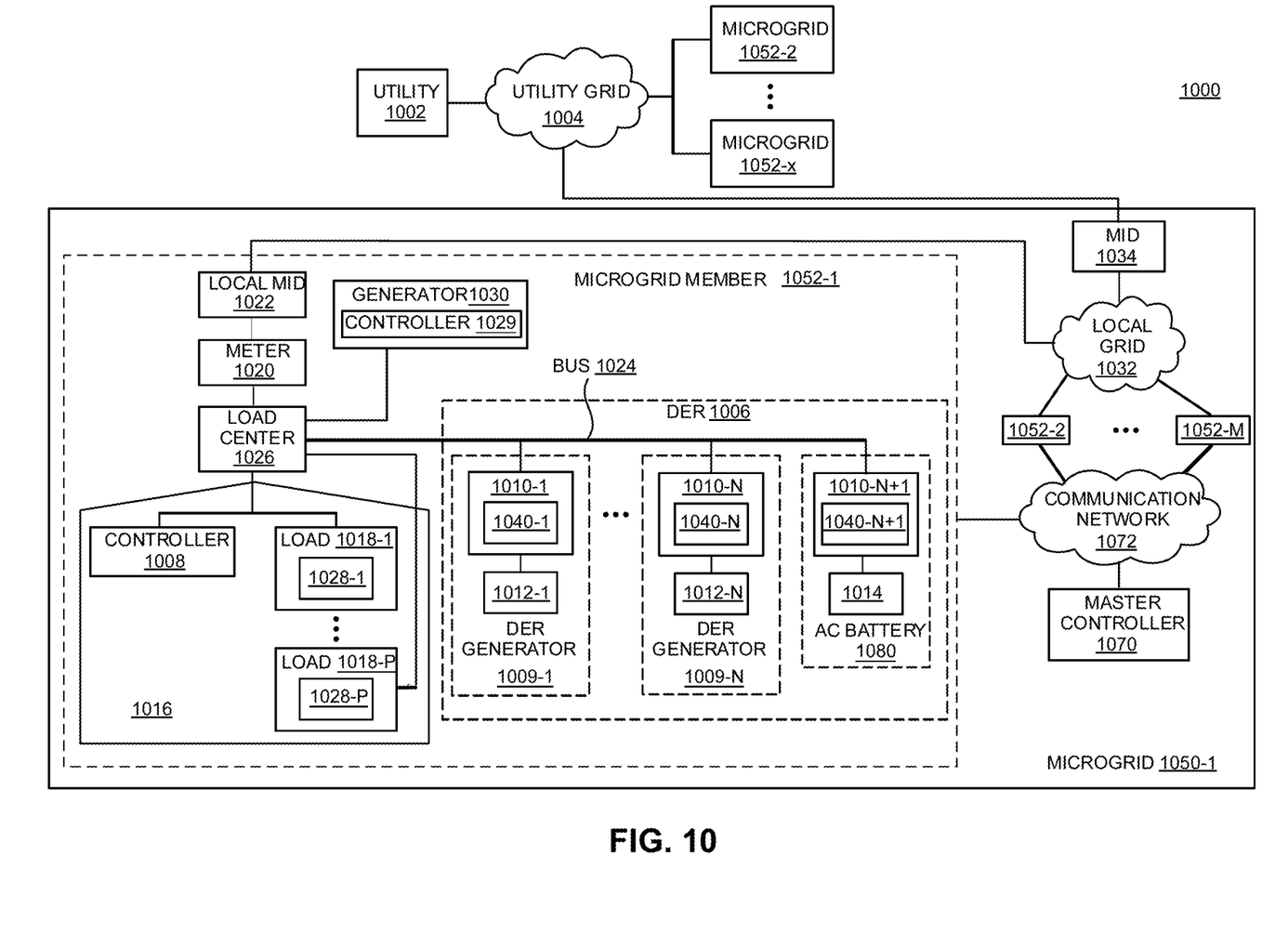
FIG. 10 is a block diagram of a power system in accordance with one or more embodiments of the present disclosure.

FIG. 10 is a block diagram of a power system 1000 in accordance with one or more embodiments of the present disclosure. This diagram only portrays one variation of the myriad of possible system configurations. The present disclosure can function in a variety of environments and systems.

The power system 1000, portions of which can function as the power system 800, comprises a utility 1002 (such as a conventional commercial utility) and a plurality of microgrids 1050-1, 1050-2, . . . , 1050-X (collectively referred to as microgrids 1050) coupled to the utility 1002 via a utility grid 1004 (e.g., a three-phase utility grid). Through their connections to the utility grid 1004, each microgrid 1050 as a whole may receive energy from the utility grid 1004 or may place energy onto the utility grid 1004. In some embodiments, coupling energy to a commercial utility grid is strictly controlled by regulation and the microgrids 150 maintain or strive to maintain a zero-energy output policy.

Each microgrid 1050 is capable of operating without energy supplied from the utility 1002 and may cover a neighborhood, a village, a small city, or the like, as the term "microgrid" is not intended to imply a particular system size.

Although the microgrid 1050-1 is depicted in detail in FIG. 10 and described herein, the microgrids 1050-2 through 1050-X are analogous to the microgrid 1050-1. However, the number and/or type of various microgrid components may vary among the microgrids 1050.

The microgrid 1050-1 comprises a plurality of microgrid members 1052-1, 1052-2, . . . , 1052-M (collectively referred to as microgrid members 1052), each of which is a microgrid that can operate when isolated from the rest of the microgrid 1050. The microgrid members 1052 are coupled to a local grid 1032 which in turn is coupled to the utility grid 1004 via a microgrid interconnect device (MID) 1034 (which may also be referred to as an island interconnect device, or IID). The local grid 1032 may be a trunk of the utility grid 1004 or it may be a specifically designed local grid for the microgrid 1050-1. In some embodiments the local grid 1032 may be a three-phase grid, although in other embodiments it may be a single-phase grid.

The MID 1034 generally comprises a controller having a processor (not shown) and determines when to disconnect/connect the microgrid 1050-1 from/to the utility grid 1004 and performs the disconnection/connection (although in some embodiments the MID 1034 may receive instructions from another component or system for disconnecting from/connecting to the utility grid 104). When connected to the utility grid 1004, the microgrid 1050-1 operates in a grid-connected (GC) mode; when disconnected from the utility grid 1004, the microgrid 1050-1 operates in an islanded (IS) mode. For example, the MID 1034 may detect a fluctuation, disturbance or outage with respect to the utility grid 1004 and, as a result, disconnect the microgrid 1050-1 from the utility grid 1004. The MID 1034 may also disconnect the microgrid 1050-1 from the utility grid 1004 when the microgrid 1050-1 is either overproducing energy or overloading the utility grid 1004. Once disconnected from the utility grid 1004, the microgrid 1050-1 can continue to generate power as an intentional island without imposing safety risks on any line workers that may be working on the utility grid 1004. The MID 1034 may additionally comprise a transceiver (not shown) for communicating with one or more of the microgrid components. In certain embodiments the MID 1034 may send command and control signals to one or more microgrid member components (e.g., the controller 1008, the power conditioners 1010, the generator 1030, and the loads 1018), such as secondary and/or tertiary control instructions (e.g., active and reactive current commands to resource controllers), which may be generated by the MID 1034 or received from another device.

The microgrid member 1052-1 comprises a building 1016 (e.g., a residence, commercial building, or the like) coupled to a load center 1026 which may be within or outside of the building 1016. The load center 1026 is coupled to the local grid 1032 via a utility meter 1020 and a local MID 1022, a distributed energy resource (DER) 1006, a generator 1030, and a plurality of loads 1018-1 . . . 1018-P, which can function as the loads 808, (collectively referred to as loads 1018) for coupling power among these components. Although the microgrid member 1052-1 is depicted in detail in FIG. 10 and described herein, the microgrid members 1052-2 through 1052-M are analogous to the microgrid member 1052-1. However, the number and/or types of various microgrid member components may vary among the microgrid members 1052.

The local MID 122 generally comprises a controller having a processor (not shown) and determines when to disconnect/connect the microgrid member 1052-1 from/to the local grid 1032 and performs the disconnection/connection (although in some embodiments the local MID 1022 may receive instructions from another component or system for disconnecting from/connecting to the local grid 1032). For example, the local MID 1202 may detect a grid fluctuation, disturbance or outage and, as a result, disconnect the microgrid member 1052-1 from the local grid 1032. The MID 1022 may also disconnect the microgrid member 1052-1 from the local grid 1032 when the microgrid member 1052-1 is either overproducing energy or overloading the local grid 1032. When connected to the local grid 1032, the microgrid member 1052-1 operates in a grid-connected (GC) mode; when disconnected from the local grid 1032, the microgrid member 1052-1 operates in an islanded (IS) mode. Once disconnected from the local grid 1032, the microgrid member 1052-1 can continue to generate power as an intentional island without imposing safety risks on any line workers that may be working on the local grid 1032. The local MID 1022 may comprise a transceiver (not shown) for communicating with one or more of the microgrid member components. In certain embodiments the MID 1022 may send command and control signals to one or more of the controller 1008, which can function as the controller 802, the power conditioners 1010, the generator 1030, and the loads 1018 (e.g., secondary and/or tertiary control instructions, such as active and reactive current commands to resource controllers, which may be generated by the MID 122 or received from another device).

The meter 1020 measures the ingress and egress of energy for the microgrid member 1052-1; in some embodiments, the meter 1020 comprises the MID 1022 or a portion thereof. The meter 1020 generally measures active power flow (kWh), reactive power flow (kVAR), grid frequency, and grid voltage (referred to herein as the measured parameters). In certain embodiments these measured parameters may be communicated to a microgrid monitoring system (not shown) that monitors each of the microgrid members 1052.

The DER 106 comprises power conditioners 1010-1 . . . 1010-N, 1010-N+1 coupled in parallel to a bus 1024 that is further coupled to the load center 1026. Generally, the power conditioners 1010 are bi-directional inverters and a first subset of the power conditioners 1010 generate power from DC energy sources (e.g., renewable energy sources such as wind, solar, hydro, and the like) while a second subset of the power conditioners 1010 generate power from/couple energy to energy storage/delivery devices (e.g., batteries or the like). The combination of a DC energy source and a corresponding power conditioner 1010 may be referred to herein as a DER generator (e.g., DER generators 1009-1-1009-N). In those embodiments where the power conditioners 1010 are DC-AC inverters, a power conditioner 1010 coupled to an energy storage/delivery device may together be referred to as an AC battery; in those embodiments where the power conditioners 1010 are DC-DC converters, a power conditioner 1010 coupled to an energy storage/delivery device may together be referred to as a battery DC supply.

In one or more embodiments, such as the embodiment depicted in FIG. 10, the power conditioners 1010-1 . . . 1010-N are respectively coupled to DC energy sources 1012-1 . . . 1012-N (e.g., renewable energy sources such as wind, solar, hydro, and the like) for receiving DC power and generating commercial grid-compliant AC power that is coupled to the bus 1024. In some of these embodiments, each DC source 1012 is a photovoltaic (PV) module. In some alternative embodiments, multiple DC sources 1012 are coupled to a single power conditioner 1010 (e.g., a single, centralized power conditioner).

As further depicted in FIG. 10, the power conditioner 1010-N+1 is coupled to an energy storage/delivery device 1014 to form an AC battery 1080. The power conditioner 1010 of the AC battery 1080 can convert AC power from the bus 1024 to energy that is stored in the energy storage/delivery device 1014, and can further convert energy from the energy storage/delivery device 1014 to commercial grid-compliant AC power that is coupled to the bus 1024. The energy storage/delivery device 1014 may be any energy storage device having a "charge level", such as a battery, flywheel, compressed air storage, or the like. Although only a single AC battery 1080 is depicted in FIG. 10, other embodiments may comprise more AC batteries 180 or even no AC batteries 1080.

Each of the power conditioners 1010 comprises a power conditioner controller 1040 for controlling the corresponding power conditioner 1010, which may include primary control techniques such as implementing droop control techniques that allow the power conditioners 1010 to share the load in a safe and stable manner when the microgrid member 1052-1 is disconnected from the utility 1002 or the local grid 1032 (or, alternatively, when operating in a grid-connected mode).

The controller 1008 is coupled to the bus 1024 via the load center 1026 and communicates with the power conditioners 1010, the generator 1030, and the loads 1018 (e.g., via power line communications (PLC) and/or other types of wired and/or wireless techniques). The controller 1008 may send command and control signals to one or more of the power conditioners 1010, the generator 1030, and the loads 1018 (e.g., secondary (and/or tertiary) control instructions, (such as active and reactive current commands to resource controllers, which may be generated by the controller 1008 or received from another device, one or more LUTs, such as the load-based primary regulation LUT, and the like) and/or receive data (e.g., status information, performance data, power usage during discrete states, and the like) from one or more of the power conditioners 1010, the generator 1030, and/or the loads 1018. In some embodiments, the controller 1008 may be a gateway that is further coupled, by wireless and/or wired techniques, to a master controller 1070 via a communication network 1072 (e.g., the Internet) for communicating data to/receiving data from the master controller 1070 (e.g., performance information, alarms, messages, control instructions, and the like). In some embodiments the master controller 1070 may send command and control signals to one or more of the controller 1008, the power conditioners 1010, the generator 1030, and/or the loads 1018 (e.g., secondary and/or tertiary control instructions, such as active and reactive current commands to resource controllers, which may be generated by the master controller 1070 or received from another device, one or more LUTs, such as the load-based primary regulation LUT, and the like), and/or receive data from one or more of controller 1008, the power conditioners 1010, the generator 1030, and/or the loads 1018 (e.g., status information, performance data, power usage during discrete states, and the like). In some embodiments the controller 1008 and/or the master controller 1070 may comprise a load-based primary regulation control module, such as the load-based primary regulation control module 806, for performing the load-based primary regulation control described herein.

In certain embodiments, the controller 1008 comprises the local MID 1022 or a portion of the local MID 1022 (e.g., an islanding module for monitoring grid health, detecting grid failures and disturbances, determining when to disconnect from/connect to the local grid 1032, and driving a disconnect component accordingly, where the disconnect component may be part of the controller 1008 or, alternatively, separate from the DER controller 1008). In some embodiments, the controller 1008 may coordinate with the local MID 1022, e.g., using PLC.

Although the microgrid member 1052-1 is depicted in FIG. 10 as having a single DER 1006, in other embodiments the microgrid member 1052-1 may have additional DERs, each of which may be different types of DERs (e.g., solar, wind, and the like). In some alternative embodiments, the DER controller 1008 and the DER generators 1009 are absent from the microgrid member 1052-1 and the DER 1006 comprises only one or more AC batteries 1080.

The generator 1030 is an energy generator, such as a diesel generator, that automatically increases or curtails energy output depending on the needs of the microgrid member 1052-1. The generator 1030 comprises a generator controller 129. The generator controller 1029 may optimize the operation of the generator 1030 with respect to the microgrid member 1052-1 and/or the microgrid 1050-1 (e.g., by generating control instructions for the generator 1030); implement control instructions for operating the generator 1030 (e.g., instructions received from another component, such as the controller 1008, or from another system); obtain data pertaining to the generator 1030 (e.g., performance data, operational data, or the like) which may further be communicated to another component or system; or perform similar functions. The generator controller 1029 may implement droop control techniques to control operation of the generator 1030 when the microgrid member 1052-1 is operating in an islanded mode, although in some alternative embodiments the generator 1030 may also be controlled using droop control when operating in a grid-connected mode.

In one or more embodiments, the power conditioners 1010 and the generator 1030 are droop-controlled such that when the microgrid member 1052-1 is disconnected from the local grid 1032 or the utility grid 1004 (e.g., using the MID 1022 and/or the MID 1034) and operating in an autonomous mode, the power conditioners 1010 and the generator 1030 employ the same droop control technique for parallel operation without the need for any common control circuitry or communication among the components.

The loads 1018 are non-throttleable loads (e.g., hot water heaters, refrigerators, HVAC equipment, pumps, electric cars, room lighting, and the like) that that operate in discrete states and consume energy from the transmission line electrically interconnecting the microgrid components (which may be referred to as the microgrid member grid, the microgrid grid, or simply the grid) obtained via the load center 1026. Although the loads 1018 are depicted in FIG. 10 as within the building 1016, one or more of the loads 1018 may be located outside of the building 1016. The loads 1018 may be static loads, dynamic loads, or some combination thereof (i.e., some of the loads 1018 are static loads while others are dynamic loads).

The loads 1018 are intelligent loads (which may also be referred to as "smart loads") that each comprise a load controller 1028, which can function as the load controllers 812, for controlling operation of the corresponding load 1018 (e.g., utilizing the load-based primary regulation LUT for participating in primary regulation; for implementing preset control instructions and/or control instructions received, for example via PLC, from another component, such as the controller 1008; and the like), obtaining data pertaining to the corresponding load 1018 (e.g., performance data, operational data, and the like) which may further be communicated to another component or system; receiving information from one or more components of the system 1000 (e.g., receiving one or more of the LUTs described herein) and/or performing similar functions. By utilizing the techniques described herein the loads 1018 operate within the hierarchical control structure of the system 1000 and participate in primary regulation as described herein, as well as, in certain embodiments, secondary and/or tertiary regulation as described herein.

Each of the controllers 1008, 1028, 1029, 1040, and 1070 may be comprised of hardware, software, or a combination thereof, and may in certain embodiments comprise a central processing unit (CPU) coupled to each of support circuits and a memory. Each of the controllers 1008, 1028, 1029, 1040, and 1070 may be implemented using a general purpose computer that, when executing particular software, becomes a specific purpose computer for performing various embodiments of the present disclosure. In those embodiments where a controller includes a CPU, the CPU may comprise one or more conventionally available microprocessors, microcontrollers and the like, which are capable of performing the processing described herein; e.g., the CPU may be a microcontroller comprising internal memory for storing controller firmware that, when executed, provides the functionality described herein. In certain embodiments, the CPU may include one or more application specific integrated circuits (ASICs). The support circuits coupled to the CPU are well known circuits used to promote functionality of the CPU (e.g., a cache, power supplies, clock circuits, buses, network cards, input/output (I/O) circuits, and the like). The memory coupled to the CPU may comprise random access memory, read only memory, removable disk memory, flash memory, and various combinations of these types of memory. The memory is sometimes referred to as main memory and may, in part, be used as cache memory or buffer memory. The memory generally stores the operating system (OS) of the controller, which may be one of a number of commercially available OSs such as, but not limited to, Linux, Real-Time Operating System (RTOS), and the like. The memory generally stores various forms of application software that, when executed, performs one or more functions described herein.

While the foregoing is directed to embodiments of the present disclosure, other and further embodiments of the disclosure may be devised without departing from the basic scope thereof, and the scope thereof is determined by the claims that follow.

The invention claimed is:

1. A method for load-based primary regulation in a power system, comprising:
   receiving information pertaining to each load of a plurality of loads in a power distribution system;
   generating, using the information, a plurality of combinations of operating states for the plurality of loads that provides a pseudo-linear response for all the plurality of loads;
   generating a look up table (LUT) that comprises the plurality of combinations of operating states;
   transmitting the LUT to each load of the plurality of loads for use by the plurality of loads in primary regulation so that each load of the plurality of loads can respond to fluctuations of other loads within the power system and coordinate a control action that provides enough time for each load of the plurality of loads to relax into steady-state operation; and
   based on incrementing or decrementing information included in the LUT and received at a limit-cycle detection and prevention (LDP) circuit programmed to decrement at a fixed rate corresponding to a flicker rate of each load of the plurality of loads, autonomously detecting when limit-cycle oscillations are above the fixed rate and automatically increasing a hysteric coefficient in the LUT to eliminate the limit-cycle oscillations.

2. The method of claim 1, wherein the combination of loads is determined based on a target step size for the pseudo-linear response.

3. The method of claim 1, wherein the plurality of combinations of operating states is computed using a knapsack algorithm.

4. The method of claim 1, wherein the LUT is a hysteretic LUT.

5. The method of claim 4, wherein the LUT comprises, for each combination of loads, increment and decrement thresholds.

6. The method of claim 5, wherein the decrement thresholds are computed using a hysteresis coefficient.

7. The method of claim 6, wherein the hysteresis coefficient is at least 2 and no greater than 3.

8. Apparatus for load-based primary regulation in a power system, comprising:
   a controller, comprising at least one processor, that:
      receives information pertaining to each load of a plurality of loads in a power distribution system;
      generates, using the information, a plurality of combinations of operating states for the plurality of loads that provides a pseudo-linear response for all the plurality of loads;
      generates a look up table (LUT) that comprises the plurality of combinations of operating states;
      transmits the LUT to each load of the plurality of loads for use by the plurality of loads in primary regulation so that each load of the plurality of loads can respond to fluctuations of other loads within the power system and coordinate a control action that provides enough time for each load of the plurality of loads to relax into steady-state operation; and
      based on incrementing or decrementing information included in the LUT and received at a limit-cycle detection and prevention (LDP) circuit programmed to decrement at a fixed rate corresponding to a flicker rate of each load of the plurality of loads, autonomously detecting when limit-cycle oscillations are above the fixed rate and automatically increasing a hysteric coefficient in the LUT to eliminate the limit-cycle oscillations.

9. The apparatus of claim 8, wherein the combination of loads is determined based on a target step size for the pseudo-linear response.

10. The apparatus of claim 8, wherein the plurality of combinations of operating states is computed using a knapsack algorithm.

11. The apparatus of claim 8, wherein the LUT is a hysteretic LUT.

12. The apparatus of claim 11, wherein the LUT comprises, for each combination of loads, increment and decrement thresholds.

13. The apparatus of claim 12, wherein the decrement thresholds are computed using a hysteresis coefficient.

14. The apparatus of claim 13, wherein the hysteresis coefficient is at least 2 and no greater than 3.

15. A non-transitory computer readable medium comprising a program that, when executed by a processor, performs a method for load-based primary regulation in a power system, the method comprising:
   receiving information pertaining to each load of a plurality of loads in a power distribution system;
   generating, using the information, a plurality of combinations of operating states for the plurality of loads that provides a pseudo-linear response for all the plurality of loads;
   generating a look up table (LUT) that comprises the plurality of combinations of operating states;
   transmitting the LUT to each load of the plurality of loads for use by the plurality of loads in primary regulation so that each load of the plurality of loads can respond to fluctuations of other loads within the power system and coordinate a control action for calculating a relaxation constant that provides enough time for each load of the plurality of loads to relax into steady-state operation; and
   based on incrementing or decrementing information included in the LUT and received at a limit-cycle detection and prevention (LDP) circuit programmed to decrement at a fixed rate corresponding to a flicker rate of each load of the plurality of loads, autonomously detecting when limit-cycle oscillations are above the fixed rate and automatically increasing a hysteric coefficient in the LUT to eliminate the limit-cycle oscillations.

16. The non-transitory computer readable medium of claim 15, wherein the combination of loads is determined based on a target step size for the pseudo-linear response.

17. The non-transitory computer readable medium of claim 15, wherein the plurality of combinations of operating states is computed using a knapsack algorithm.

18. The non-transitory computer readable medium of claim 15, wherein the LUT is a hysteretic LUT.

19. The non-transitory computer readable medium of claim 18, wherein the LUT comprises, for each combination of loads, increment and decrement thresholds.

20. The non-transitory computer readable medium of claim 19, wherein the decrement thresholds are computed using a hysteresis coefficient, the hysteresis coefficient at least 2 and no greater than 3.

\* \* \* \* \*